United States Patent
Maruta et al.

(10) Patent No.: US 6,375,255 B1
(45) Date of Patent: Apr. 23, 2002

(54) REAR PASSENGER SEAT IN VEHICLE COMPARTMENT

(75) Inventors: Tsutomu Maruta, Shimoyama-mura; Naoki Wakasugi, Miura; Shigeru Nakagawa, Okazaki, all of (JP)

(73) Assignees: Toyota Jidosha Kabushiki Kaisha; Araco Kabushiki Kaisha, both of Aichi-Ken; Kanto Jidosha Kogyo Kabushiki Kaisha, Kanagawa-Ken, all of (JP)

( * ) Notice: Subject to any disclaimer, the term of this patent is extended or adjusted under 35 U.S.C. 154(b) by 0 days.

(21) Appl. No.: 09/635,698

(22) Filed: Aug. 10, 2000

(30) Foreign Application Priority Data

Aug. 10, 1999 (JP) .......................................... 11-226698

(51) Int. Cl.$^7$ ................................................ B60N 2/36
(52) U.S. Cl. ................. 297/15; 297/378.1; 297/378.13; 296/65.01; 296/65.09
(58) Field of Search ............................... 297/15, 378.1, 297/378.11, 378.12, 378.13; 296/65.01, 65.05, 65.09, 65.16

(56) References Cited

U.S. PATENT DOCUMENTS

| | | | |
|---|---|---|---|
| 1,649,608 A | * 11/1927 | Matthews | 297/15 X |
| 3,311,405 A | 3/1967 | Brennan et al. | 296/66 |
| 5,195,795 A | * 3/1993 | Cannera et al. | 297/15 X |
| 5,240,302 A | * 8/1993 | Yoshida et al. | 297/15 X |
| 5,328,238 A | * 7/1994 | Yamakazi | 297/378.1 X |
| 5,482,349 A | * 1/1996 | Richter et al. | 297/15 |
| 5,527,087 A | * 6/1996 | Takeda et al. | 297/15 |
| 5,681,077 A | * 10/1997 | Hashimoto | 297/15 |
| 5,839,773 A | * 11/1998 | Ban et al. | 297/15 X |
| 5,979,964 A | * 11/1999 | Ban et al. | 297/15 X |
| 6,030,038 A | * 2/2000 | Namba et al. | 297/378.13 X |
| 6,099,072 A | * 8/2000 | Sturt et al. | 297/15 |
| 6,106,046 A | * 8/2000 | Reichel | 297/15 X |
| 6,113,191 A | * 9/2000 | Seibold | 297/378.1 |
| 6,123,380 A | * 9/2000 | Sturt et al. | 297/15 X |
| 6,199,951 B1 | * 3/2001 | Zeile et al. | 297/15 X |
| 6,279,982 B1 | * 8/2001 | Nishimura et al. | 297/15 X |

FOREIGN PATENT DOCUMENTS

| | | | |
|---|---|---|---|
| DE | 19607060 C1 | 4/1997 | ............ B60N/2/36 |
| DE | 19705281 A | 8/1998 | ............ B60N/2/36 |
| JP | 3(1991)-200444 | 9/1991 | |
| JP | 4(1992)-76532 | 6/1992 | |
| JP | 5(1993)-26610 | 2/1993 | |
| JP | 5(1993)-208633 | 8/1993 | |
| JP | 6(1994)-22062 | 1/1994 | |
| JP | 7(1995)-137565 | 5/1995 | |
| JP | 10-129316 | 5/1998 | ............ B60N/2/36 |
| JP | 10(1998)129316 | 5/1998 | |

* cited by examiner

Primary Examiner—Peter M. Cuomo
Assistant Examiner—Rodney B. White
(74) Attorney, Agent, or Firm—Reed Smith LLP

(57) ABSTRACT

A rear passenger seat adapted for use in a vehicle compartment, the passenger seat having a seat cushion the front end portion of which is supported by a support leg assembly pivotally mounted on a recessed portion of the compartment floor and the rear end portion of which is locked in place by means of a lock mechanism on a deck portion of the compartment floor, wherein the support leg assembly includes a support leg pivotally mounted on the recessed portion of the compartment floor for pivotal movement in a fore-and-aft direction, a leg support member pivoted at its lower end to an upper end of the support leg and pivoted at its upper end to a support frame of the seat cushion to be folded forward at the upper end of the support leg and retainer means provided on a vertical wall between the recessed portion and deck portion of the compartment floor for releasably retaining the support leg assembly in an upright position by engagement therewith, and wherein a pneumatic spring is disposed a between the leg support member of the support leg assembly and a rear end portion of the support frame of the seat cushion to bias the leg support member in a direction for straightening the support leg assembly.

5 Claims, 5 Drawing Sheets

REAR PASSENGER SEAT IN VEHICLE COMPARTMENT

BACKGROUND OF THE INVENTION

1. Field of the Invention

The present invention relates to a rear passenger seat adapted for use in a vehicle compartment.

2. Description of the Prior Art

Disclosed in Japanese Patent Laid-open Publication No. 10-129316 is a rear passenger seat slidably mounted on a deck portion of a vehicle compartment floor to be moved in a fore-and-aft direction and supported by a link mechanism composed of a first link member for support of the passenger seat and a second link member pivoted to a rear end of the first link member at its upper end and slidably mounted on a recessed portion of the compartment floor for movement in a fore-and-aft direction. The passenger seat is locked in place by means of a lock mechanism on the deck portion of compartment floor and can be moved forward by release of the lock mechanism and housed in the recessed portion of compartment floor in a condition where a back rest of the seat has been folded on a seat cushion of the seat. The link mechanism is straighten on the compartment floor when the passenger seat is housed in the recessed portion of compartment floor as described above. The link mechanism in the passenger seat is, however, complicated in construction and causes difficulty in operation for setting up the passenger seat on the deck portion of the compartment floor.

SUMMARY OF THE INVENTION

It is, therefore, a primary object of the present invention to provide a rear passenger seat wherein a support mechanism for support of the passenger seat is provided in a simple construction and wherein the passenger seat is accurately positioned to be locked by a lock mechanism on a deck portion of a vehicle compartment floor.

According to the present invention, the object is accomplished by providing a rear passenger seat adapted for use in a vehicle compartment, the passenger seat having a seat cushion the front end portion of which is supported by a support leg assembly pivotally mounted on a recessed portion of the compartment floor and the rear end portion of which is locked in place by means of a lock mechanism on a deck portion of the compartment floor, wherein the support leg assembly comprises a support leg pivotally mounted on the recessed portion of the compartment floor for pivotal movement in a fore-and-aft direction, a leg support member pivoted at its lower end to an upper end of the support leg and pivoted at its upper end to a support frame of the seat cushion to be folded forward at the upper end of the support leg and retainer means provided on a vertical wall between the recessed portion and deck portion of the compartment floor for releasably retaining the support leg assembly in an upright position by engagement therewith, and wherein a pneumatic spring is disposed between the leg support member of the support leg assembly and a rear end portion of the support frame of the seat cushion to bias the leg support member in a direction for straightening the support leg assembly.

In a practical embodiment of the present invention, the lock mechanism may comprise a striker mounted on the deck portion of the compartment floor and a pair of laterally spaced latch members pivoted to the rear end portion of the support frame of the seat cushion and maintained in engagement with the striker when the seat cushion is positioned in place on the deck portion of the compartment floor. In the rear passenger seat, it is preferable that a link mechanism is provided between a front end portion of the support frame of the seat cushion and the lock mechanism

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
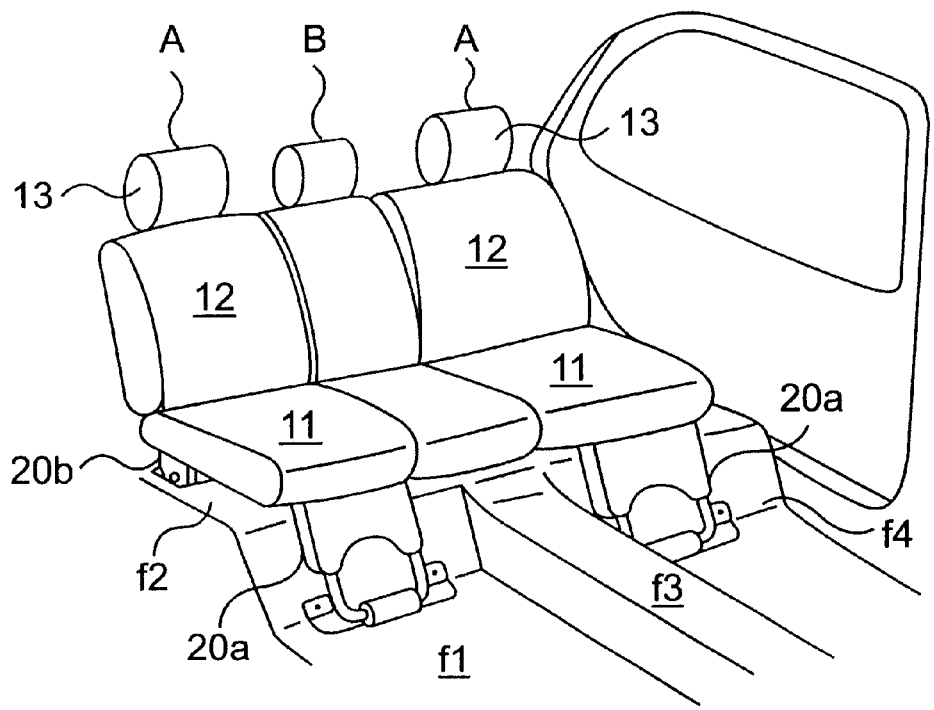
FIG. 1 is a perspective view of a rear passenger seat composed of three seats arranged parallel in a vehicle compartment.

Illustrate in FIG. 1 of the drawings is a rear passenger seat in the form of three seats arranged in parallel in a vehicle compartment. The passenger seat is composed of a pair of side seats A and a center seat B. The side seats A each are composed of a seat cushion 11, a back rest 12 and a head rest 13. As shown in FIGS. 3 to 6, the side seats A each are equipped with a support leg assembly 20a, a lock mechanism 20b, a pneumatic spring 20c and a link mechanism 30. The support leg assembly 20a is pivotally mounted on a recessed portion f1 of the vehicle compartment floor for pivotal movement in a fore-and-aft direction. The seat cushion 11 of side seat A is supported by the support leg assembly 20a at its front end and is locked in place by means of the lock mechanism 20b assembled at its rear end portion on a deck portion f2 of the compartment floor f.

Figure 2:
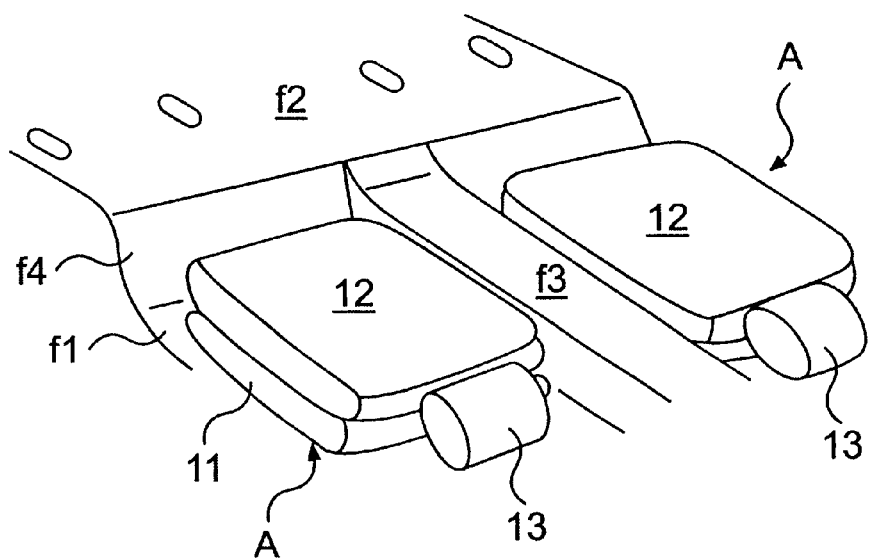
FIG. 2 illustrates a folded condition of both the side seats of the passenger seat.

When the lock mechanism 20b is released, the seat cushion 11 can be moved forward with the back rest 12 folded thereon so that the side seat A is housed in the recessed portion f1 of compartment floor f in a condition where a rear surface of the back rest 12 is placed at the same level as the deck portion f2 of compartment floor f as shown in FIG. 2 The seat cushion 11 of center seat B is removably jointed at one side thereof to the seat cushion 11 of side seat A by means of a joint mechanism (not shown) and supported by a side leg (not shown) on the deck portion f2 of compartment floor f. When the folded side seat A is housed in the recessed portion f1 of compartment floor f, the center seat B is separated from the side seat A and removed from the deck portion f2 of compartment floor f.

Figure 3:
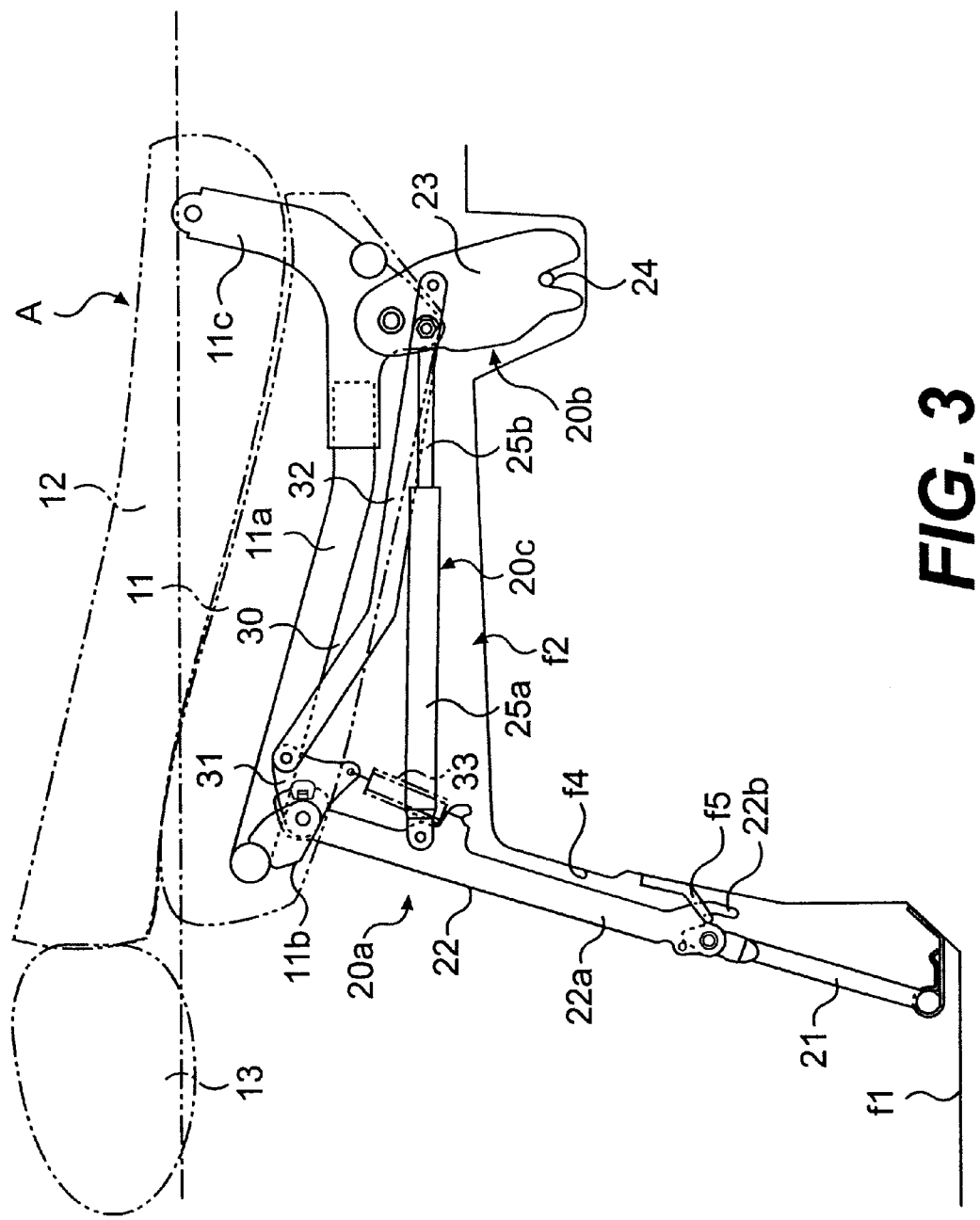
FIGS. 3–6 illustrate modes of operation of a support mechanism of the passenger seat.

As shown in FIGS. 1 and 3, the support leg assembly 20a is composed of a first linkage in the form of a U-shaped support leg 21 pivotally mounted on a recessed portion f1 of compartment floor f for pivotal movement in a vertical plane and a second linkage in the form of a leg support member 22 pivoted to the upper ends of support leg 21 for pivotal movement in a vertical plane. The upper end of leg support member 22 is pivoted to a pair of laterally spaced front brackets 11b welded to a front end portion of a rectangular support frame 11a of the seat cushion 11 for pivotal movement in a fore-and-aft direction.

In the support leg assembly 20a, the leg support member 22 has a body portion 22a formed at its lower end with a downward hook 22b for engagement with a hanger f5 fixed to a vertical wall f4 extending downward from the deck portion f2. The downward hook 22b of leg support member 22 is brought into engagement with the banger f5 when the support leg assembly 20a is placed in an upright position as shown in FIG. 3 and is disengaged from the hanger f5 when the leg support member 22 is pivotally moved forward on the upper end of support leg 21.

The lock mechanism 20b includes a pair of rear brackets 11c fixed to a rear end portion of the support frame 11a of seat cushion 11a, a pair of laterally spaced latch members 23 pivoted to the rear brackets 11c for pivotal movement in a fore-and-aft direction, and a lateral striker 24 fixedly mounted on the deck portion f2 of the compartment floor f. The latch members 23 each are provided with a spring loaded pawl (not shown) assembled therewith. When the latch members 23 and pawls are engaged with the striker 24, the rear end portion of seat cushion 11 is locked in place on the deck portion f2 of compartment floor f as shown in FIG. 3. When the seat cushion 11 is raised at its lower end portion, the latch members 23 and pawls are disengaged from the striker 24.

Figure 4:
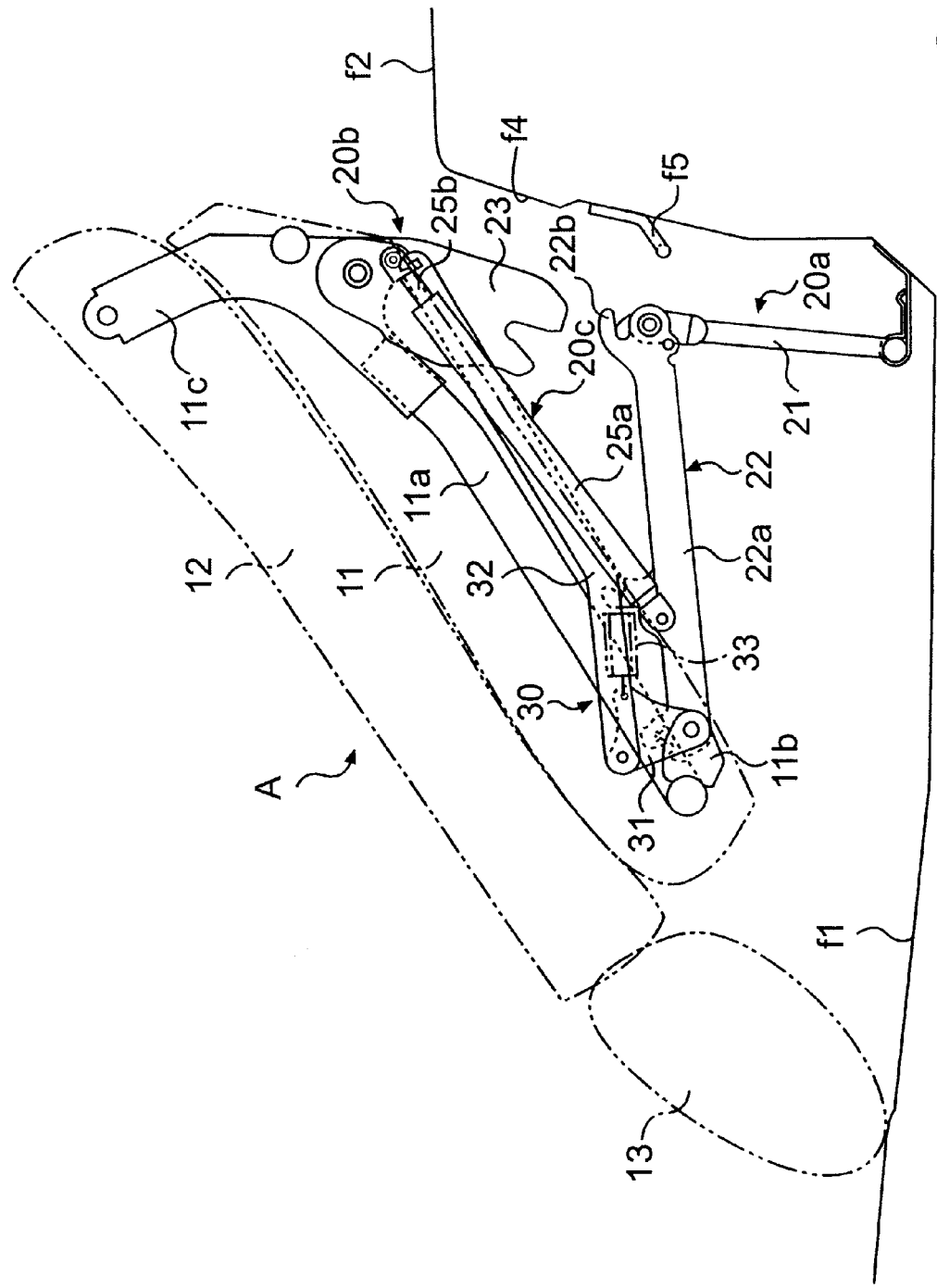
Figure 6:
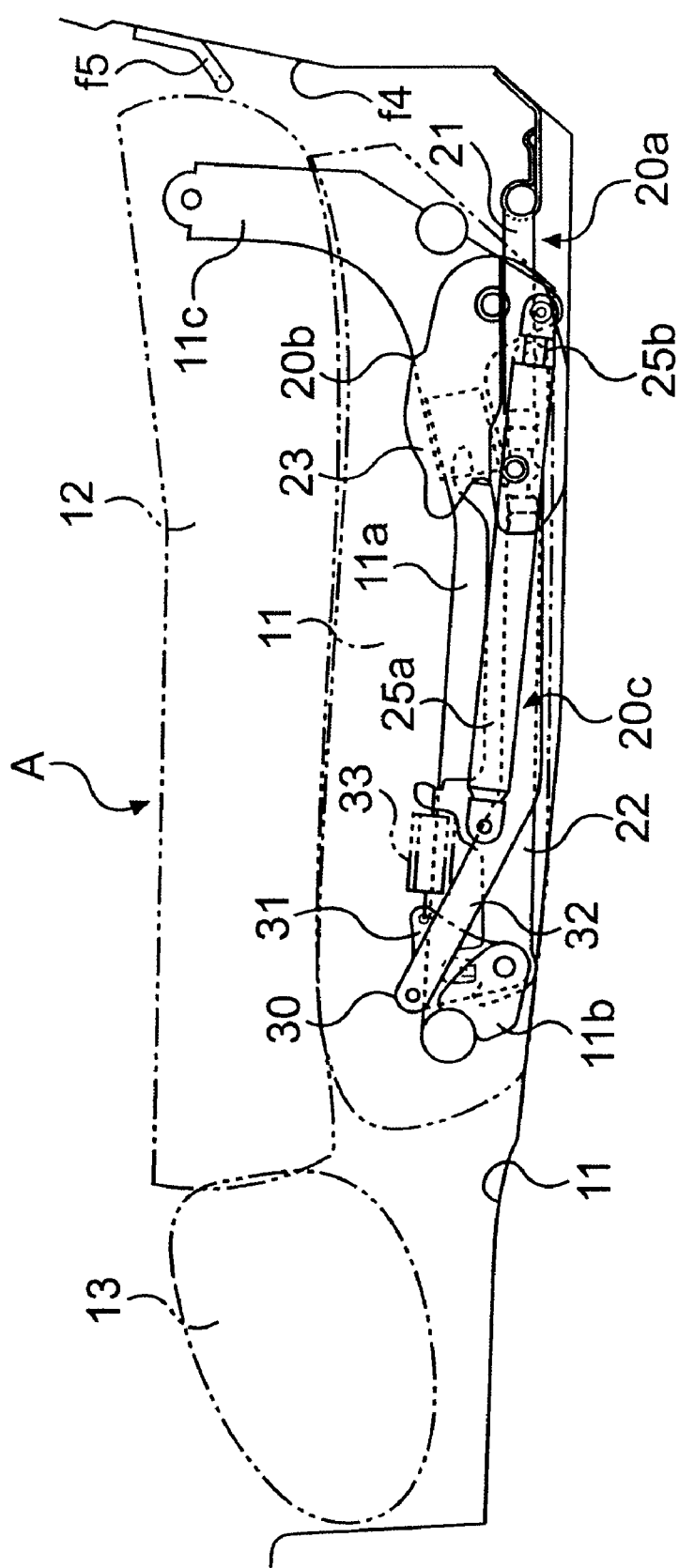

The pneumatic spring 20c is in the form of a pneumatic damper composed of a cylinder 25a and a piston rod 25b slidably disposed in the cylinder 25a. The cylinder 25a is pivoted at its front end to an upper portion of leg support member 22 between the front brackets 11b, while the piston rod 25b is pivoted at its rear end to a support shaft carried by the rear brackets 11c of seat cushion 11. When the support leg assembly 20a is straighten and placed in an upright position as shown in FIG. 3, the pneumatic damper 20c is extended in a maximum extent. While the side seat A is displaced forward and housed in the recessed portion f1 of compartment floor f as shown in FIG. 6, the pneumatic damper 20c is compressed in a maximum extent as shown in FIG. 4.

The link mechanism 30 is composed of a pair of laterally spaced triangle rotary plates 31 pivoted to the front brackets 11b of seat cushion 11 together with the opposite ends of leg support member 22, a pair of laterally spaced parallel link members 32 pivoted at their front ends to each upper corner of triangle rotary plates 31 and at their rear ends to the latch members 23 of lock mechanism 20b, and a pair of coil springs 33 hooked at their one ends to each lower corner of the triangle rotary plates 31 and at their other ends to each hanger provided at opposite sides of the leg support member 22. In the link mechanism 30, each rear end of the parallel link members 32 is pivoted to the respective latch members 23 of lock mechanism 20b at a position located below each pivot position of latch members 23.

Normally, the side seat A is locked in place by means of the lock mechanism 20 on the deck portion f2 of compartment floor f as shown in FIG. 1. When it is desired to expand the interior space of the vehicle compartment, the side seat A is moved forward with the back lest 12 folded thereon so that the side seat A is housed in the recessed portion f1 of compartment floor f in a condition where the rear surface of back rest 12 is placed at the same level as the deck portion f2 of compartment floor f as shown in FIG. 2.

Figure 5:
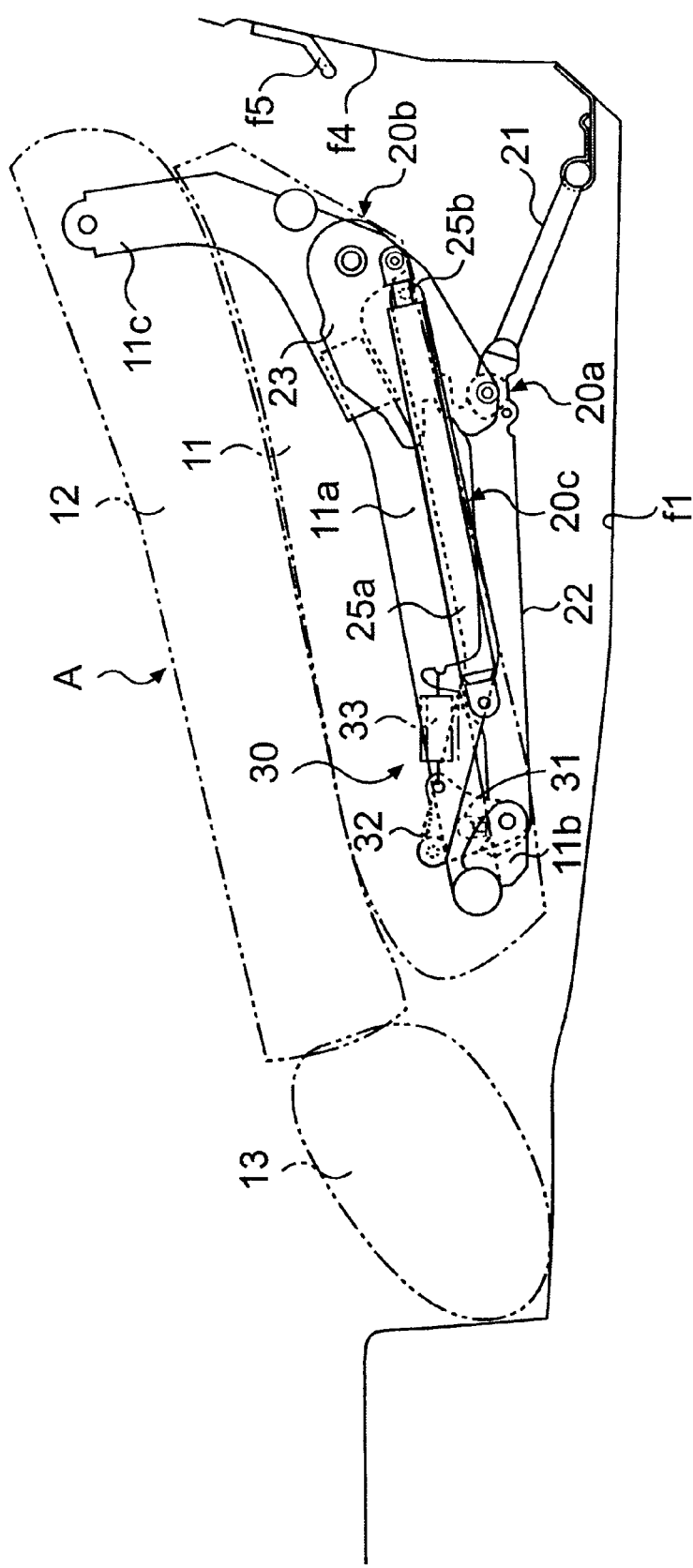

To fold the side seat A forward as shown in FIG. 2, the back rest 12 is folded on the seat cushion 11 as shown in FIG. 3. In such a condition, the rear end portion of seat cushion 11 is raised to disengage the latch members 23 and pawls from the striker 24, and the side seat A is moved forward as shown in FIG. 4. In this instance, the leg support member 22 is released from the hanger f5 and is pivotally moved forward with a fulcrum at the upper end of support leg 21. Simultaneously, the support leg 21 is pivotally moved forward, and the pneumatic damper 20c is compressed in maximum so that the side seat A is inclined downward. When the side seat A is pushed down at its rear end portion, the support leg 21 and leg support member 22 are moved down as shown in FIG. 5. Thus, the support leg assembly 20a is extended in a straight condition on the recessed portion f1 of compartment floor f as shown in FIG. 6, and the side seat A is housed in the recessed portion f1 of compartment floor f as shown in FIG. 2.

To set up the side seat A on the deck portion f2 of compartment floor f, the side seat A is raised at its rear end portion as shown in FIG. 5 and moved rearward so that the support leg 21 is raised as shown in FIG. 4. When the side seat A is further moved rearward, the leg support member 22 is raised and straighten with the support leg 21 as shown in FIG. 3, and the hook 22b of leg support member 22 is brought into engagement with the hanger f5 to retain the support leg assembly 20a in a upright position. As a result, the front end portion of seat cushion 11 is supported by the support leg assembly 20a, while the link mechanism 30 causes the latch members 23 and pawls of lock mechanism 20b to bring into engagement with the striker 24. Thus, the side seat A is locked at its rear end portion in place on the deck portion f2 of compartment floor f as shown in FIG. 1. When the seat cushion 11 of side seat A is supported by the support leg assembly 20a at its front end portion in the course of its rearward movement as described above, the pneumatic damper 20c acts to place the rear end portion of seat cushion 11 in position on the deck portion f2 of compartment floor f so that the seat cushion 11 is accurately locked by the lock mechanism 20b.

As the pneumatic damper 20c is extended in maximum when the support leg assembly 20 is retained in the upright position to support the front end portion of the seat cushion 11 and is compressed in maximum when the seat cushion 11 is moved forward to be housed in the recessed portion f1 of compartment floor f or moved rearward to be placed on the deck portion f2 of compartment floor f, the pneumatic damper 20c acts to bias the seat cushion 11 forward or rearward in the course of forward or rearward movement of the seat cushion 11. This is useful to reduce an effort applied to the seat cushion. The pneumatic damper 11 also acts to raise the rear end portion of seat cushion 11 at an initial stage of forward or rearward movement of the seat cushion 11. This is useful to avoid abutment of the seat cushion 11 against the recessed portion f1 of compartment floor f or the lock mechanism 20b on the deck portion f2 of compartment floor f.

What is claimed is:

1. A rear passenger seat adapted for use in a vehicle compartment, the passenger seat having a seat cushion the front end of which is supported by a support leg assembly to be pivotally mounted on a recessed portion of the compartment floor and the rear end of which is placed to be locked in place by means of a lock mechanism on a deck portion of the compartment floor, wherein said support leg assembly comprises a support leg placed to be pivotally mounted on the recessed portion of the compartment floor for pivotal movement in a fore-and-aft direction, a leg support member pivoted at its lower end to an upper end of said support leg and pivoted at its upper end to a support frame of the seat cushion to be folded forward at the upper end of said support leg and retainer means adapted to be mounted on a vertical wall between the recessed portion and deck portion of the compartment floor for releasably retaining said support leg assembly in an upright position by engagement therewith, and wherein a pneumatic spring is disposed between said leg support member of said support leg assembly and a rear end portion of the support frame of the seat cushion to bias said leg support member in a direction for straightening the support leg assembly.

2. A rear passenger seat as claimed in claim 1, wherein said lock mechanism comprises a striker adapted to be mounted on the deck portion of the compartment floor and a pair of laterally spaced latch members pivoted to the rear end portion of the support frame of said seat cushion and maintained in engagement with said striker when said seat cushion is positioned in place on the deck portion of the compartment floor.

3. A rear passenger seat as claimed in claim 1, wherein said pneumatic spring is in the form of a pneumatic damper extendable in a fore-and-aft direction.

4. A rear passenger seat as claimed in claim 1, wherein a link mechanism is provided between a front end portion of the support frame of said seat cushion and said lock mechanism.

5. A rear passenger seat as claimed in claim 4, wherein said link mechanism includes a rotary plate pivoted to the front end portion of the support frame of said seat cushion, a link member pivoted at its front end to an upper corner of said rotary plate and pivoted at its rear end to a latch member pivoted to the rear end portion of the support frame of said seat cushion for engagement with a striker mounted on the deck portion of the compartment floor.

* * * * *